United States Patent [19]

Fiala

[11] 4,364,353
[45] Dec. 21, 1982

[54] ANTI-KNOCKING APPARATUS FOR AN INTERNAL COMBUSTION ENGINE

[75] Inventor: Ernst Fiala, Wolfsburg, Fed. Rep. of Germany

[73] Assignee: Volkswagenwerk Aktiengesellschaft, Wolfsburg, Fed. Rep. of Germany

[21] Appl. No.: 219,352

[22] Filed: Dec. 22, 1980

[30] Foreign Application Priority Data

Dec. 20, 1979 [DE] Fed. Rep. of Germany ....... 2951321

[51] Int. Cl.³ .......................... F02P 5/14; F02D 9/00
[52] U.S. Cl. ..................................... 123/425; 123/435
[58] Field of Search ............... 123/425, 419, 435, 436, 123/198 A

[56] References Cited

U.S. PATENT DOCUMENTS

| | | | |
|---|---|---|---|
| 2,401,563 | 6/1946 | Hersey | 123/425 |
| 2,595,524 | 5/1952 | Henneman et al. | 123/435 |
| 4,002,155 | 1/1977 | Harned et al. | 123/425 |
| 4,153,020 | 5/1979 | King et al. | 123/425 |

FOREIGN PATENT DOCUMENTS 2274796  1/1976  France .
2337261  7/1977  France .

OTHER PUBLICATIONS

SAE–Paper No. 79 01 73, "Energy Conservation with Increased Compression Ratio and Electronic Knock Control", by Currie, Grossman and Gumbleton, 1979.

*Primary Examiner*—Charles J. Myhre
*Assistant Examiner*—Andrew M. Dolinar
*Attorney, Agent, or Firm*—Spencer & Kaye

[57] ABSTRACT

For reducing knocking in an externally ignited, mixture-compressing internal combustion engine, the moment of ignition is delayed up to a predetermined maximum as a function of signals emitted by a knocking sensor. Thereafter, if engine knocking continues, the throttle valve is moved in the closing sense.

1 Claim, 2 Drawing Figures

ANTI-KNOCKING APPARATUS FOR AN INTERNAL COMBUSTION ENGINE

BACKGROUND OF THE INVENTION

This invention relates to an apparatus for operating an externally ignited, mixture-compressing internal combustion engine wherein the ignition is delayed as a function of signals emitted by a knocking sensor.

It is known to decrease the tendency of knocking in an externally ignited, mixture-compressing internal combustion engine by altering the moment of ignition. In this manner, the mixture compression in the internal combustion engine can be increased particularly in order to achieve a better degree of efficiency in the partial load range and to thus achieve a better fuel consumption. The tendency of knocking which appears during full load and high rpm's is reduced by a corresponding shift in the moment of ignition. Since knocking appears dependent upon the available fuel under different values of final mixture compression, it is conceivable that a circumstance sets in when despite a substantial shift of the ignition angle in the delaying sense, knocking is still not eliminated. Such an occurrence can lead to a damage to the internal combustion engine.

SUMMARY OF THE INVENTION

It is an object of the invention to provide an improved apparatus with the aid of which the ignition angle shift in the delaying sense is limited, yet knocking is effectively eliminated.

This object and others to become apparent as the specification progresses, are accomplished by the invention, according to which, briefly stated, the shift of the ignition angle in the delaying sense is effected only up to a predetermined maximum value and, in case knocking continues, the throttle valve angle is progressively reduced, until engine knocking is suppressed.

By reducing the throttle valve angle according to the invention, it is ensured that in case the ignition angle shift in the delaying sense has still not resulted in an elimination of knocking, a further knocking is reliably eliminated by reducing the engine output. In this manner, internal combustion engines can be satisfactorily operated - by foregoing a maximum power output, to be sure - with inferior fuel even when the final mixture compression is such that it would otherwise cause knocking.

The apparatus according to the invention comprises a knocking sensor, an ignition angle shifting device and a throttle valve adjusting device, both responsive to signals of the knocking sensor. When engine knocking occurs, first the ignition angle shifting device is actuated and delays ignition up to a predetermined maximum. If knocking persists, the throttle valve adjusting device responds to the knocking sensor and progressively reduces the throttle valve angle.

DESCRIPTION OF THE PREFERRED EMBODIMENT

Figure 1:
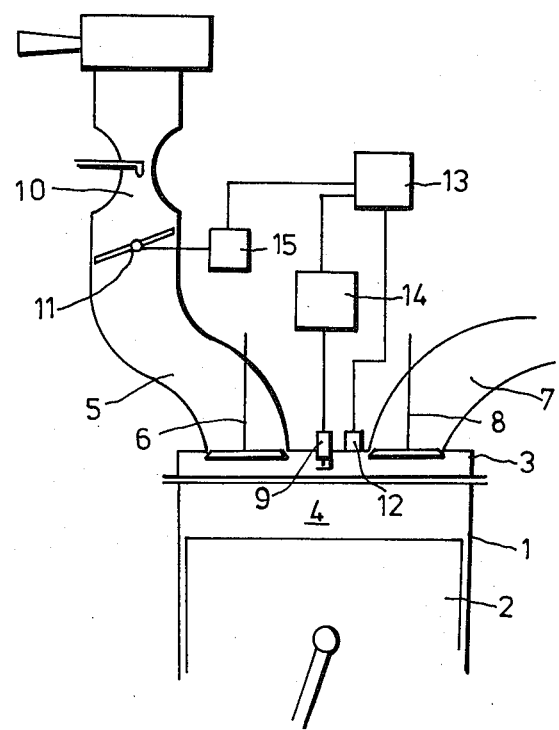
FIG. 1 is a schematic and diagrammatic elevational view of a preferred embodiment of the invention.

Turning to FIG. 1 there is schematically shown a cylinder 1 of a multicylinder, externally ignited, mixture-compressing internal combustion engine. The cylinder 1 accommodates a reciprocating piston 2, the top face of which, together with a cylinder head 3, bounds a combustion chamber 4 of variable volume. Into the combustion chamber 4 merge an intake conduit 5 controlled by an intake valve 6 as well as an exhaust conduit 7 controlled by an exhaust valve 8. A spark plug 9 projects into the combustion chamber 4 for igniting the combustible mixture enclosed in the combustion chamber when the piston 2 is in the zone of the upper dead center at the end of the compression stroke.

In the intake conduit 5 there is arranged a carburetor 10 which admixes fuel to the intake air in a quantity adapted to the momentary operational condition of the internal combustion engine. The carburetor 10 is arranged upstream of a branch-off (not shown) leading to the other engine cylinders. Downstream of the carburetor 10, as viewed in the direction of the mixture flow towards the combustion chamber 4, there is arranged a throttle valve (butterfly valve) 11 which is operated by an accelerator pedal (not shown) for controlling at will the output of the internal combustion engine.

A knocking sensor 12 is arranged at the cylinder 1 and responds when knocking in the cylinder occurs, by emitting signals to a control device 13 which, as a function of the signals received from the knocking sensor 12, actuates a device 14 for shifting the ignition angle of the spark plugs 9 as well as a device 15 for changing (decreasing) the angle of the throttle valve 11. Thus, when knocking occurs in a combustion chamber of the internal combustion engine, first the ignition angle of the spark plugs is shifted in the delaying sense in a manner known by itself. This delaying shift of the ignition angle, however, continues only up to a predetermined maximum value. If, upon reaching such value, engine knocking persists and thus the knocking sensor 12 continues to respond, the device 15 is actuated for progressively reducing the throttle valve angle, that is, for progressively increasing the throttle effect. Thus, in order to avoid damage to the internal combustion engine in case of continuing knocking after a predetermined ignition delay has been achieved, the output of the engine is progressively reduced and thus, by reducing the charge, the mixture compression drops and engine knocking is suppressed.

Further, by limiting the shift of the ignition angle, an excessively high exhaust gas temperature is avoided which could cause damage to the exhaust pipe and/or to the exhaust gas catalysts connected with the exhaust pipe. The throttle valve adjusting system, however, has to be so structured - for example, by including spring elements - that despite a fully depressed accelerator pedal, a turning of the throttle valve by the device 15 in the closing sense is nevertheless feasible.

The above-described anti-knocking control will now be set forth in more detail with reference to FIG. 2.

Figure 2:
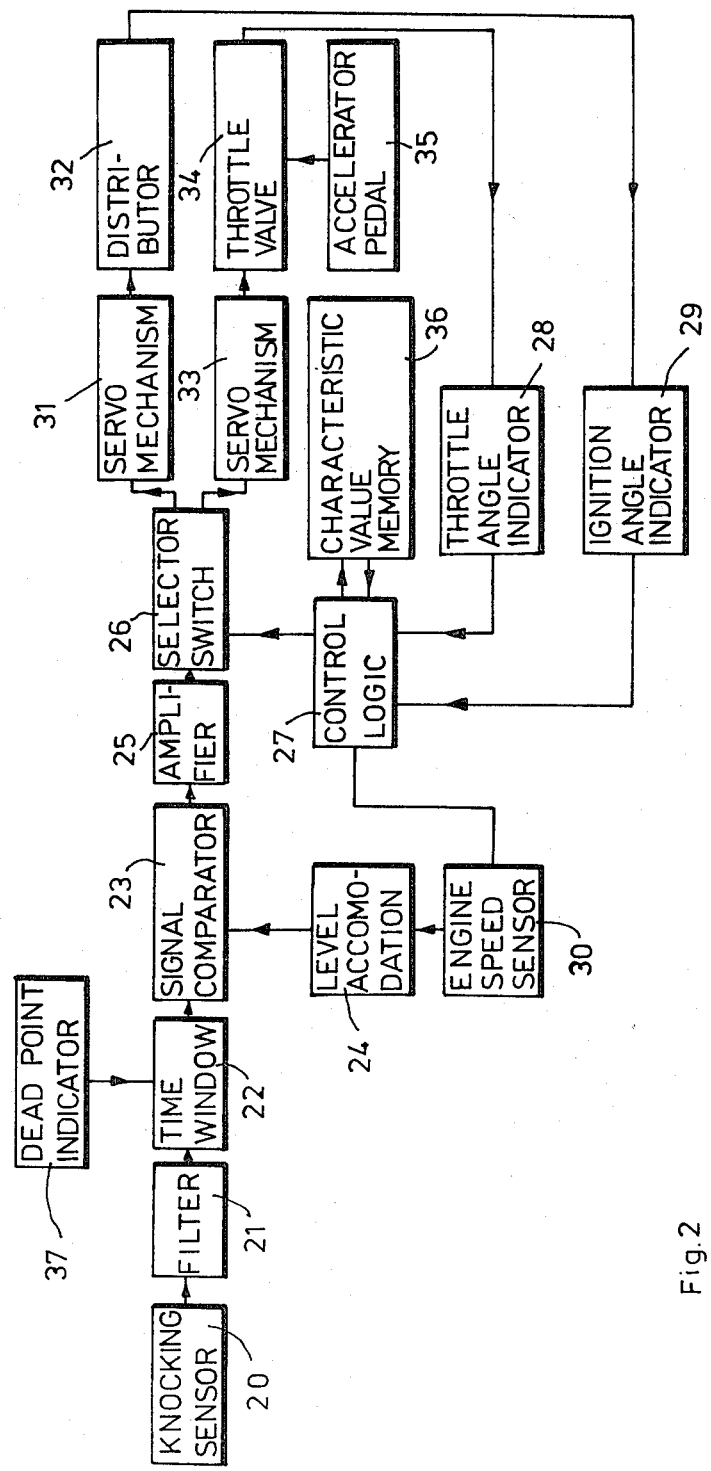
FIG. 2 is a block diagram illustrating the basic arrangement of the anti-knocking apparatus according to the present invention.

In FIG. 2, there is shown a knocking sensor 20 for emitting signals when knocking in the cylinders of the engine occurs. In order to use only one knocking sensor for all cylinders of the engine and to insure that the knocking vibration will be transmitted as equally as possible from all cylinders, the location of the sensor has to be carefully selected. A preferred point for mounting the knocking sensor may be the intake manifold of the engine.

A knocking sensor formed by a magnetostrictive accelerometer which can be used in the knocking apparatus according to the invention is shown and described in the SAE-Paper No. 79 01 73 entitled "Energy Conservation with Increased Compression Ratio and Electronic Knock Control" by James H. Currie, David S. Grossman and James J. Gumbleton.

The knocking sensor 20 of FIG. 2 is connected to a filter 21 which cuts off the frequency ranges which are of no interest for measuring the knocking. Behind the filter 21 there is provided a time window 22 which passes on the signals from the filter 21 to a signal comparator 23 only within a small time interval of perhaps 30 to 40 degrees (measured in crank angle) past the compression point of each cylinder. To that effect the time window 22 receives a signal about the crank shaft position e.g. from a dead point dead center indicator 37.

In the signal comparator 23 the knocking signal is compared with a predetermined noise level which is dependent on the engine speed. The variable noise level is delivered by a level accommodation 24 which receives signal representing the actual engine speed from an engine speed sensor 30.

There is further provided an amplifier 25, the output of which is applied over a selector switch 26 to a servomechanism 31 for shifting the ignition distributor 32 or to a servomechanism 33 for adjusting the throttle valve 34, respectively. The position of the selector switch 26 is controlled by a control logic 27 which changes over the selector switch 26 from a first position connecting the amplifier 25 to the servomechanism 31 to a second position connecting the amplifier 25 to the servomechanism 33 if a predetermined maximum value of ignition delay is reached. The predetermined maximum value of ignition delay preferably is variable in dependence on the actual operating point of the engine. Therefore the control logic 27 receives information about the engine speed from the engine speed sensor 30 and about the throttle angle from a throttle angle indicator 28, so that the actual operating point of the engine can be determined.

The control logic 27 is further connected to a characteristic value memory 36 storing the predetermined maximum values of ignition delay which are variable in dependence on the operating point of the engine and may lie between 3 and 10 degrees crank angle.

Thus the control logic 27 compares the actual value of ignition delay delivered by an ignition angle indicator 29 with the predetermined maximum value delivered by the characteristic value memory 36 and changes over the selector switch 26 to the second position if the predetermined maximum value is reached.

The servomechanisms 31 and 33 for shifting the ignition distributor 32 and the throttle valve 34, respectively, are well known in the art and can be operated for example by suction pressure delivered from the intake conduit of the engine upstream the throttle valve. It is feasible, however, to operate the servomechanism by hydraulic or electric means.

As shown in FIG. 2 the throttle valve 34 is also connected to the accelerator pedal 35 for arbitrary operation by the driver's foot.

It will be understood that the above description of the present invention is susceptible to various modifications, changes and adaptations, and the same are intended to be comprehended within the meaning and range of equivalents of the appended claims.

What is claimed is:

1. In an internal combustion engine, including means defining a combustion chamber, an intake for introducing a combustible mixture into the combustion chamber, a throttle valve controlling the flow of the mixture in the intake; ignition means for externally igniting the mixture in the combustion chamber and an apparatus for reducing engine knocking; the improvement in said apparatus comprising:
   (a) a knocking sensor operatively coupled to said combustion chamber for responding to knocking therein and for emitting signals representing the knocking;
   (b) an ignition shifting device connected to said ignition means for shifting the moment of ignition in a delaying sense;
   (c) a valve moving device connected to said throttle valve for moving said throttle valve in a closing sense; and
   (d) control means connected to said knocking sensor, said ignition shifting device and said valve moving device for effecting actuation solely of said ignition shifting device up to a maximum predetermined delay in ignition when signals from said knocking sensor are received and for effecting actuation solely of said valve moving device after said maximum predetermined delay has been reached and upon continued receipt of signals from said knocking sensor.

* * * * *